United States Patent [19]
Lichtenbelt et al.

[11] Patent Number: 6,144,383
[45] Date of Patent: *Nov. 7, 2000

[54] VOLUMETRIC DATA ORGANIZATION METHOD THAT ALLOWS FOR CACHE EFFICIENT RENDERING SPEEDUPS AND EFFICIENT GRAPHICS HARDWARE DESIGN

[75] Inventors: Barthold Lichtenbelt; Shaz Naqvi, both of Ft. Collins, Colo.; Tom Malzbender, Palo Alto, Calif.

[73] Assignee: Hewlett-Packard Company, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/865,757
[22] Filed: May 30, 1997
[51] Int. Cl.⁷ .................................................. G06T 17/00
[52] U.S. Cl. ........................................ 345/419; 345/424
[58] Field of Search .................................... 345/424, 419, 345/422, 425; 382/131

[56] References Cited

U.S. PATENT DOCUMENTS

| | | | |
|---|---|---|---|
| 4,685,070 | 8/1987 | Flinchbaugh | 345/424 |
| 4,985,856 | 1/1991 | Kaufman et al. | 345/424 |
| 5,187,660 | 2/1993 | Civanlar et al. | 345/424 |
| 5,201,035 | 4/1993 | Stytz et al. | 345/463 |
| 5,255,366 | 10/1993 | Chia et al. | 345/516 |
| 5,313,567 | 5/1994 | Civanlar et al. | 345/424 |
| 5,381,518 | 1/1995 | Drebin et al. | 345/424 |
| 5,412,763 | 5/1995 | Knoplioch et al. | 345/424 |
| 5,557,711 | 9/1996 | Malzbender | 345/422 |
| 5,594,844 | 1/1997 | Sakai et al. | 345/427 |
| 5,625,760 | 4/1997 | Fujita | 345/424 |
| 5,831,623 | 11/1998 | Negishi et al. | 345/424 |
| 5,963,211 | 10/1999 | Oikawa et al. | 345/424 |

OTHER PUBLICATIONS

Foley, van Dam, Feiner, & Hughes Computer Graphics, Second Edition, Copyright 1990 pp. 548–51; 866–71; 914–15; 1034–39.

Goldwasser & Walsh High Speed Volume Rendering of 3–D Biomedical Data IEEE Eighth Annual Conference of the Engineering in Medicine and Biology Society, Copyright 1986 pp. 1084–87.

Goldwasser Rapid Techniques for the Display and Manipulation of 3–D Biomedical Data National Computer Graphics Association, Copyright 1986 pp. 115–49.

Primary Examiner—Mark Zimmerman
Assistant Examiner—Cliff N. Vo

[57] ABSTRACT

A volumetric data organization method for volume rendering that is both cache efficient and efficient for hardware graphics design and utilization. A volume data set is divided up into a number of smaller sub-volumes or blocks through a process called blocking. The size of each sub-volume is a function of the computer system being used and/or the application program being run. Typical sub-volume sizes are approximately 5% of cache size. Each voxel tuple in a volume data set is converted to a linear address for linear storage in memory. Two techniques are used for blocking: overlapping and non-overlapping. The non-overlapping blocking technique divides the volume data set up into sub-volumes such that each sub-volume contains a unique set of voxels with no overlap of voxels between sub-volumes. The overlapping blocking technique expands each sub-volume to include voxels located on six planes that are located one voxel away from the sub-volume's existing bounding planes. After employing either technique, each sub-volume can be selected as containing desired or non-desired data. The volume rendering system ignores any sub-volumes that do not contain desired data, greatly speeding up rendering time.

12 Claims, 6 Drawing Sheets

VOLUMETRIC DATA ORGANIZATION METHOD THAT ALLOWS FOR CACHE EFFICIENT RENDERING SPEEDUPS AND EFFICIENT GRAPHICS HARDWARE DESIGN

CROSS REFERENCE TO RELATED APPLICATIONS

This application is related to: application Ser. No. 08/866,859 of Shaz Naqvi, Barthold Lichtenbelt, and Russell Huonder filed on May 30, 1997 entitled Fixed-Point Method for Fast and Precise 3D Spatial Transformations; application Ser. No. 08/865,756 of Shaz Naqvi, Russell Huonder, and Barthold Lichtenbelt filed on May 30, 1997 entitled Ray Transform Method for a Fast Perspective View Volume Rendering; and application Ser. No. 08/866,584 of Barthold Lichtenbelt, Shaz Naqvi, and Tom Malzbender filed on May 30, 1997 entitled A Volumetric Pre-Clipping Method That Guarantees Minimal Number of Sample Points Through a Volume.

FIELD OF THE INVENTION

This invention relates to computer systems, and more particularly to graphics display of discrete objects within computer systems. Even more particularly, the invention relates to volume rendering for graphics display utilizing a volumetric data organization method that is cache efficient for volume rendering and efficient for hardware design and utilization.

BACKGROUND OF THE INVENTION

Volume rendering is an important branch of computer graphics, following behind the development of geometric rendering and pixel rendering. Volume rendering refers to the direct rendering of a volume data set, also referred to as a "volume," to show the characteristics of the interior of a solid object when displayed on a 2D graphics device. A volume data set is a three-dimensional array of voxels. These voxels typically are organized on a regular gridded lattice. Voxels have been defined as sample points separated by a finite distance. Each voxel has a position and a value. The voxel position is a three-tuple specifying an x, y, and z position within the 3D voxel array. The voxel value depends upon its format. For example, a voxel may have an intensity element and an index element. These elements are usually treated differently in the volume rendering process. The collection of values for all points in the volume is called a scalar field of the volume.

Volume data sets can be generated by numerous means, but most commonly by some method of 3D scanning or sampling and by numerical modeling. For example, a volume data set may be generated by Magnetic Resonance Imaging, or MRI, wherein the density of human or animal tissue is computed at each point of a 3D grid. A display of this information could indicate the boundaries of the various types of tissue, as indicated by density changes. Volume rendering is the process of displaying this data on a 2D graphics device.

The coordinate system of the volume is referred to as the source space. The very first voxel in a volume data set in source space has coordinates $(x_0,y_0,z_0)$ wherein $x_0$, $y_0$, and $z_0$ represent the lowermost value of all x, y, and z positions in the volume data set, and is considered to be the origin of the volume data set. Normally the coordinates for this origin voxel are set to (0,0,0). The three coordinates, in order, correspond to the column, row, and slice of the image in the volume data set. The very last voxel in a volume data set is located on the opposite diagonal corner from the origin source voxel of the volume data set. Its coordinates are designated as $(x_u,y_u,z_u)$ wherein $x_u$, $y_u$, and $z_u$ represent the uppermost values of all x, y, and z positions in the volume data set.

Volume data sets can be quite large and thus can place a strain on computer system resources. For example, a typical MRI scanner volume data set may contain 6.7 million voxels or more, whereas polygon data sets for geometric rendering typically contain less than ½ million polygons. Thus, there is a much greater need for special purpose hardware acceleration when rendering volumes. Special graphics hardware is designed to execute graphics algorithms very fast, much faster than the processor in a typical computer workstation. On chip cache is RAM that resides physically on the graphics hardware chip or processor chip. On chip RAM is much cheaper than external RAM and performs much faster.

In volume rendering there is often a need to be able to view the rendered image from various projections. The coordinate system of the viewer is referred to as view space or image space. It describes from which direction the volume data set is viewed and rendered. Thus, a key step in the volume rendering process is the 3D spatial volume transformation of the original volume data set from source space to view space. Typical types of transformations required may include zoom, pan, rotation, and even shear of the input volume for projection into an output raster type display device. Once a transformation has been done, various resampling techniques must be applied, such as nearest neighbor or trilinear interpolation in addition to other steps in the volume rendering pipeline, to determine pixel values for rendering.

A ray is an imaginary line emanating from a pixel on an image plane that passes through the volume. On this ray discrete steps are taken and at each step sample points along the ray are interpolated. Sample points along the ray from the image plane to the volume do not contribute to the rendered image, as well as sample points along the ray after the ray exits the volume. Depending on the view desired by the user, some rays may not pass through the volume at all and thus contribute nothing to the rendered image. Conventional volume rendering implementations typically process all sample points along a ray whether the ray passes through the volume or not or whether the sample points along the ray are within the volume or not. These implementations often require hardware solutions to check and keep track of where sample points fall. Thus, much time and system resources are wasted in the rendering process in checking and keeping track of sample points that are not needed for rendering the image. This slows down greatly the rendering process and requires costly expenditures for hardware.

Volume rendering is a very computation intensive technique. Only the most powerful super-computers of today are able to achieve reasonable rendering speeds. One of the bottlenecks in achieving reasonable rendering speeds is the organization and retrieval of the volume data set in main memory. Volume data sets are viewed as a data structure consisting of a stack of slices, or images, that are two dimensional. The normal and natural way of working with a volume data set is on a slice by slice basis.

However, each slice contains a large number of voxels. A typical volume rendering algorithm will, at a minimum, need to work with three slices at a time. This is because voxels that lie next to each other in the volume data set reside on different slices. The amount of voxels in three slices will typically exceed any data storage size for on chip cache that is feasible today. These voxels that lie next to each other through consecutive slices are not stored linearly in memory, which also breaks cache efficiency. In addition, working with slices makes it impractical to select the slice as containing desired or non-desired data, since the slice spans the entire width and height of the volume data set. In most situations nearly every slice will contain some voxels of interest.

There is a need in the art for an improved method of volume rendering that is cache efficient in respect to data organization. There is also a need in the art to only process desired data from a volume data set to speed up rendering time. There is a further need in the art for a method that does not require external RAM in the graphics hardware but can utilize small on chip RAM instead. A further need in the art is for a method that does not process volume data sets on a slice by slice basis, which is not cache efficient, nor graphics hardware efficient. There is also a need in the art to be able to store volume data sets linearly on a storage medium, such as in memory or on disk, and in small enough sizes to utilize cache without thrashing it. A further need in the art is for a volume rendering method that will call up a volume data set from memory or disk and process it only once to speed up rendering time. It is thus apparent that there is a need in the art for an improved method of data organization for volume rendering which solves the objects of the invention. The present invention meets these needs.

This application is related to: application Ser. No. 08/866,859 of Shaz Naqvi, Barthold Lichtenbelt, and Russell Huonder filed on May 30, 1997 entitled Fixed-Point Method for Fast and Precise 3D Spatial Transformations; application Ser. No. 08/865,756 of Shaz Naqvi, Russell Huonder, and Barthold Lichtenbelt filed on May 30, 1997 entitled Ray Transform Method for a Fast Perspective View Volume Rendering; and application Ser. No. 08/866,584 of Barthold Lichtenbelt, Shaz Naqvi, and Tom Malzbender filed on May 30, 1997 entitled A Volumetric Pre-Clipping Method That Guarantees Minimal Number of Sample Points Through a Volume, which are incorporated herein by reference for all that is disclosed and taught therein.

SUMMARY OF THE INVENTION

It is an aspect of the present invention to organize a volume data set through a process called blocking in which the volume data set is divided up into smaller sub-volumes that can be processed by a volume rendering system in a highly cache efficient manner.

It is another aspect of the invention to be able to select each sub-volume if it contains desired data, and only process those sub-volumes through the volume rendering system that contain desired data.

Yet another aspect of the invention is to make the sub-volumes small enough so that an entire sub-volume will fit into processor cache when called.

Still another aspect of the invention is to make the sub-volumes small enough so that special graphics hardware will only need small on chip RAM in order to efficiently render the image.

A further aspect of the invention is to convert each voxel tuple in a sub-volume to a linear address so that the voxels may be stored linearly on a storage medium for cache efficiency.

A still further aspect of the invention is to process a sub-volume with desired data only once in the volume rendering process.

The above and other aspects of the invention are accomplished in a volumetric data organization method that allows for cache efficient volume rendering and efficient graphics hardware design and utilization. The invention employs a concept called blocking. Blocking is the process of dividing up a volume data set into much smaller sub-volumes or blocks. These sub-volumes or blocks together can be used to restore the original volume.

Each sub-volume is a three dimensional volume data set in its own, and can be treated as such by a volume rendering system. Each sub-volume is stored in main memory or on disk in a linear fashion. This is accomplished by converting each voxel tuple in the sub-volume to a linear address. This means that all the voxels in the sub-volume will be stored in a contiguous piece of main memory. If the sub-volumes are made small enough, based on the configuration of the computer system involved and the application software being utilized, the sub-volume will fit nicely into cache when called. A typical sub-volume size is in the neighborhood of 5% of cache size.

Cache is designed in such a way that it is only efficient for data that is stored linearly in main memory. The volume rendering system processes one sub-volume at a time. Since the entire sub-volume fits into cache, the processor never has to wait for data to arrive out of main memory when processing each sub-volume. Once the volume rendering system is done with the first sub-volume, it will fetch the second sub-volume and start working on that one. Thus, each sub-volume need only be called once for processing, which also greatly speeds up rendering time.

The use of blocks or sub-volumes has the additional benefit of easing the burden placed on special graphics hardware. The small sub-volumes allow the cache for such graphics hardware to be on chip instead of external, simplifying chip design, and the RAM for on chip cache does not have to be large. The size of the sub-volumes can be varied to fit the specific configuration of the computer system and graphics hardware being utilized by an application program.

Blocking can be accomplished by two different techniques: overlapping blocking or non-overlapping blocking. With the non-overlapping blocking technique, each sub-volume has a base size delineated by six bounding planes or faces having voxels located on the faces as well as interior voxels bounded by the planes. Each sub-volume contains a set of voxels that are unique for each sub-volume. There is no duplication of voxels between sub-volumes with this method. However, because sample points on rays cast through the volume data set may fall outside of the boundaries of any non-overlapping sub-volumes, the volume rendering system will have to have access to multiple sub-volumes at a time in order to perform interpolation of the sample points and gradient calculations. Thus, with the non-overlapping blocking technique, the sub-volume being processed plus up to 26 surrounding sub-volumes may be required to be called up and placed in cache. This technique places a larger burden on the graphics hardware as compared to the overlapping blocking technique.

With the overlapping blocking technique, each sub-volume has a base size delineated by six bounding planes or faces having voxels located on the faces as well as interior voxels bounded by the planes. The bounding planes and the voxels located on them are shared by adjacent sub-volumes. Each sub-volume is then expanded beyond its base size to include the closest voxels from up to 26 surrounding sub-volumes that are located on six new bounding planes. The six new bounding planes are parallel to the original six planes but are located one voxel away in a direction away from the center of the sub-volume in each of the x, y, and z directions. The result is that each sub-volume will share three planes of voxels with its adjacent neighbor in each of the x, y, and z directions. The three shared planes are the middle common plane of adjacent sub-volumes and each plane on either side of the shared common plane. For sub-volumes that are located at the extremities of the volume data set, there will be fewer sub-volumes that contribute voxels to the expanded size of the sub-volume.

With the overlapping blocking technique, only one expanded sub-volume at a time is needed by the volume rendering system. Since the expanded sub-volume contains all of the three shared planes of immediately surrounding voxels in each of the x, y, and z directions, any sample point on a ray passing through the sub-volume that falls outside of the base size of the sub-volume can be interpolated and any gradients calculated by utilizing the voxels included in the expanded size. This technique puts a lesser burden on the graphics hardware, but increases the burden on data storage capability because of each sub-volume's expanded size.

Once the volume data set has been blocked by either technique, the application program can select sub-volumes if they contain desired data needed by the user to be rendered. Selection takes place on the fly by parameters supplied by the application program being run that are stored in the sub-volumes. Sub-volumes that are not selected are not processed by the volume rendering system. If the application program being run provides no parameters for selecting sub-volumes, then the volume rendering system will process all sub-volumes. Selecting sub-volumes greatly decreases rendering time because data that contributes nothing to the desired image is not processed by the volume rendering system. In addition, blocking only needs to be done for a volume data set once. Various views can then be generated, such as multiple orthographic or perspective views, by an application program utilizing the blocking scheme.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
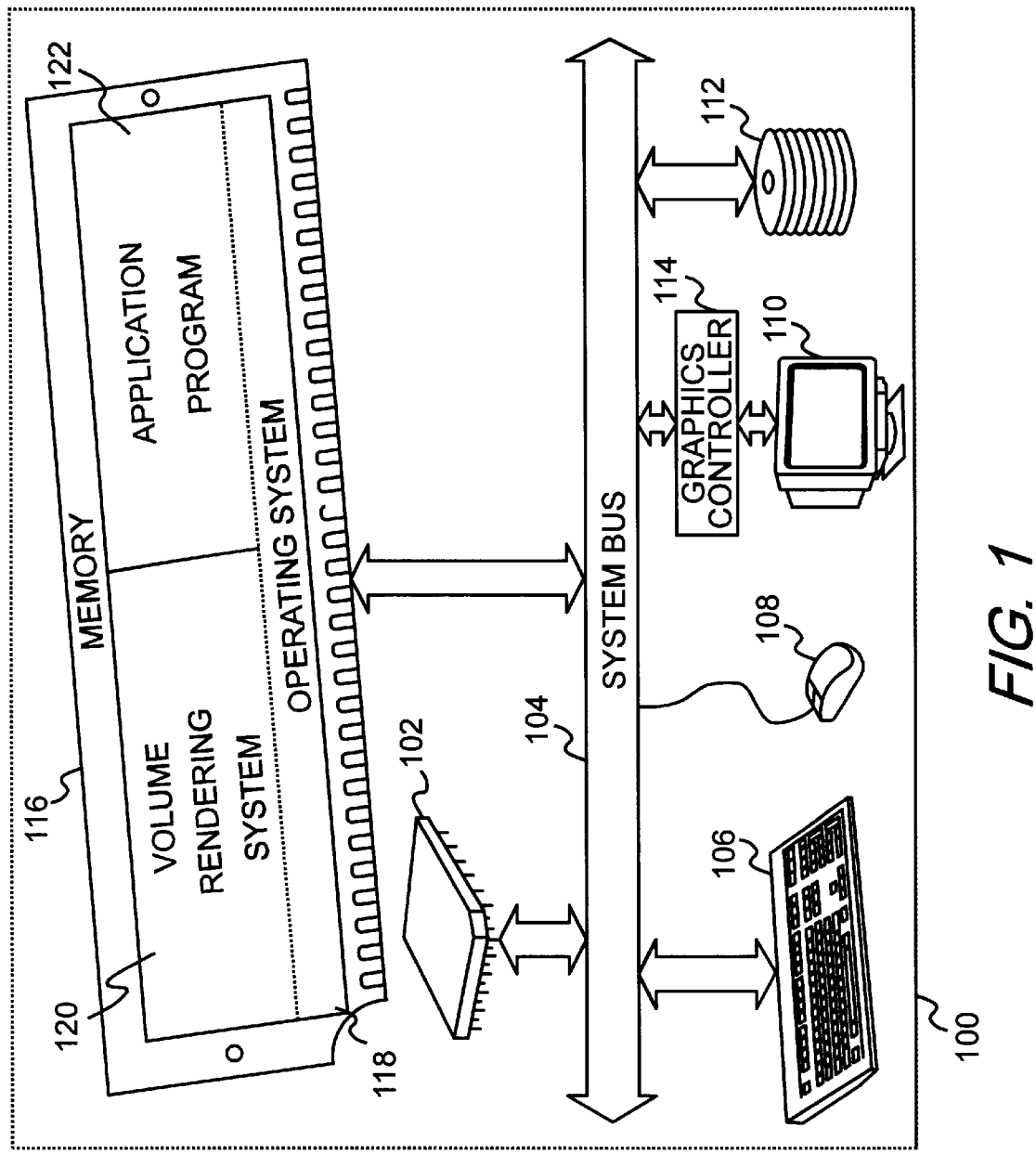
FIG. 1 shows a block diagram of a computer system having a volume rendering system incorporating the present invention.

FIG. 1 shows a block diagram of a computer system containing a volume rendering system incorporating the volumetric data organization method of the present invention. Referring now to FIG. 1, a computer system 100 contains a processing element 102 having on chip cache. Processing element 102 communicates to other elements of computer system 100 over a system bus 104. A keyboard 106 allows a user to input information into computer system 100. A graphics controller 114 having on chip cache and a graphics display 110 connected to system bus 104 allows computer system 100 to output information to the user. A mouse 108 is also used to input information and a storage device 112 is used to store data and programs within computer system 100. A memory 116, also attached to system bus 104, contains an operating system 118, an application program 122, and a volume rendering system 120 containing the volumetric data organization method of the present invention.

When called by application program 122, volume rendering system 120 begins execution by calling up a volume data set from storage device 112 and placing it in memory 116 over system bus 104. As processing begins, the volume data set is divided up into sub-volumes. Each voxel tuple of a sub-volume is converted to a linear address. After voxel tuple conversion, each sub-volume is stored linearly back to memory 116 and may also be stored back on storage device 112.

When called by application program 122, sub-volumes of the volume data set stored linearly in memory 116 are placed in cache residing on processing element 102 over system bus 104. The results obtained from processing by volume rendering system 120 are sent to the on chip cache residing on graphics controller 114 over system bus 104. Graphics controller 114 then sends the processed data to graphics display 110.

Figure 2:
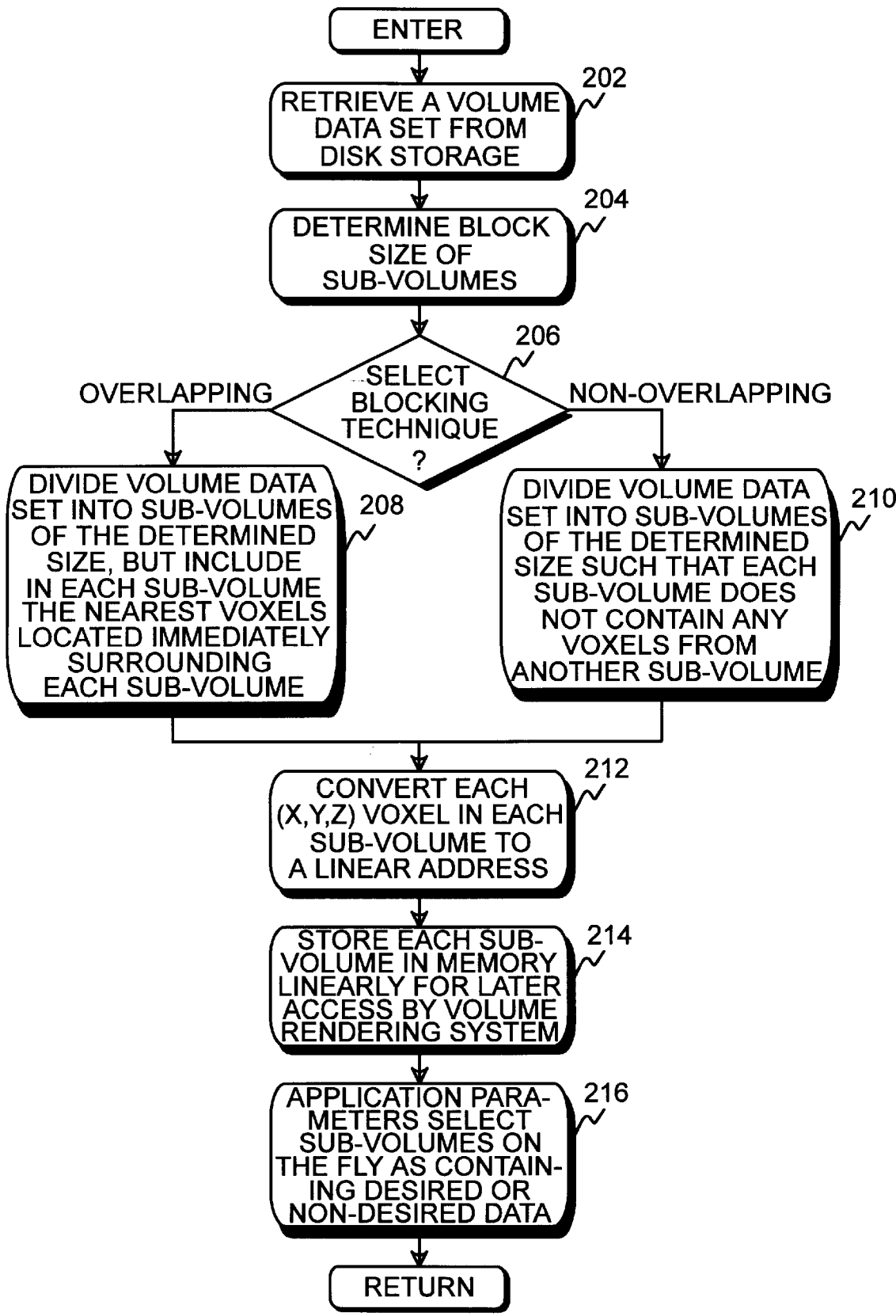
FIG. 2 shows a block diagram of a volumetric data organization method for a volume rendering system of the present invention.

FIG. 2 shows a block diagram of a volumetric data organization method for a volume rendering system of the present invention. Referring now to FIG. 2, block 202 retrieves a volume data set from disk storage. Block 204 determines the sub-volume block size based on the computer configuration and application program. In block 206, the blocking technique is selected. If the overlapping blocking technique is selected, then control passes to block 208.

Block 208 divides the volume data set into sub-volumes of the size determined in block 204. Each sub-volume is expanded to include the nearest voxels from the immediately surrounding planes, edges, and corners of the adjacent sub-volumes as explained more fully in the discussion of FIGS. 5 and 6. Each sub-volume thus overlaps each adjacent sub-volume by one voxel in the x, y, and z directions.

In creating sub-volumes that are near the peripheral boundaries of the volume data set, the determined size for sub-volumes may be such that the sub-volume will extend outside the boundaries of the volume data set. This situation can be handled in one of three ways. First, all sub-volumes can be made smaller than the determined size so that all sub-volumes will fall within the boundaries of the volume data set. This is the least preferred option. Second, only the sub-volumes that do not fit can be made smaller than the determined size. Lastly, tuple positions that fall outside the volume data set boundaries can be filled with zeros or some other non-important value. This is the favored option for the preferred embodiment of the invention.

If the non-overlapping blocking technique is selected in block 206, then control passes to block 210. Block 210 divides the volume data set into sub-volumes of the size determined in block 204. Each sub-volume does not overlap any other sub-volume. Thus, each sub-volume contains a unique set of voxels.

Block 212 converts each (x,y,z) voxel tuple to a linear address k. This is accomplished by utilizing the following formula:

$$k=x+(y*\text{block\_x\_size})+(z*\text{block\_x\_size}*\text{block\_y\_size})$$

Block_x_size is the number of voxels wide in the x-direction of the sub-volume and block_y_size is the number of voxels high in the y-direction of the sub-volume. For example, if a sub-volume was sixteen voxels wide in the x-direction, sixteen voxels high in the y-direction, and sixteen voxels deep in the z-direction, a voxel with coordinates (3,2,1) and a voxel with coordinates (4,2,1) would have a linear addresses as shown below:

$$\text{for } (3,2,1), k=3+(2*16)+(1*16*16)=3+32+256=291$$

$$\text{for } (4,2,1), k=4+(2*16)+(1*16*16)=4+32+256=292$$

By utilizing the above formula, one skilled in the art will recognize that each voxel in a sub-volume is assured to have a unique k address and a linear relationship between voxels is established.

Block 214 stores the sub-volumes with k addresses for each voxel in memory 116 (FIG. 1) or on a storage device 112 (FIG. 1). The voxels in a sub-volume will be in a linear relationship when stored in this fashion. When the volume rendering system calls up a sub-volume for processing, the linear relationship makes it ideal to place the sub-volume in cache, which greatly speeds up processing time.

In block 216, each sub-volume is selected on the fly with parameters supplied by application program 122 (FIG. 1) indicating whether the sub-volume has either desired or non-desired data. This can be accomplished by setting one or more bits with certain values indicating that the data in a sub-volume is desired or of a certain type. Alternatively, a separate data structure may be used to hold information about the contents of the sub-volumes. Once selected, the parameters used can be stored and re-used for a new rendering. If application program 122 (FIG. 1) does not supply selection parameters, then volume rendering system 120 (FIG. 1) will process all sub-volumes.

Figure 3:
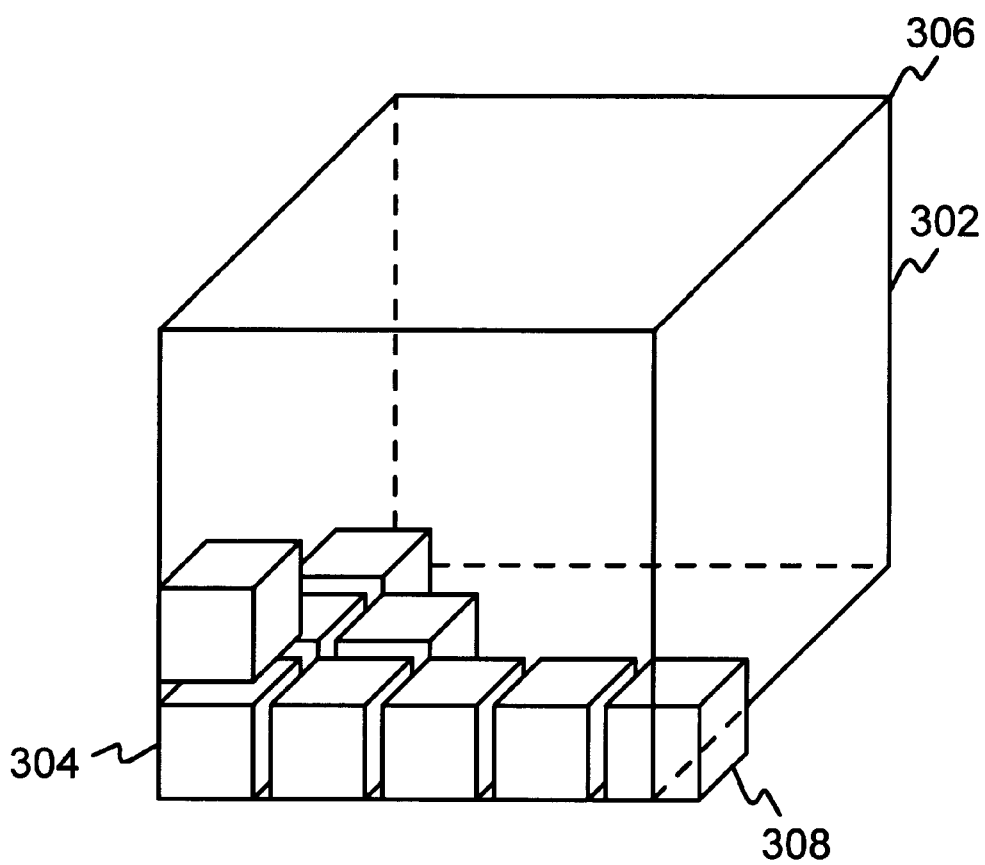
FIG. 3 illustrates graphically a volume data set being divided up into non-overlapping sub-volumes.

FIG. 3 illustrates graphically a volume data set being divided up into non-overlapping sub-volumes. Referring now to FIG. 3, volume data set 302 contains voxels organized on a regular gridded lattice. The outer boundaries of volume data set 302 are illustrated as straight lines connecting eight bounding voxels. Bounding voxel 306 is typical. Sub-volume 304 is typical of all the sub-volumes illustrated, also represented by straight lines connecting eight bounding voxels. The size of sub-volume 304 is determined based upon the configuration of the computer system and/or program application being utilized. Sub-volume 304 will be a certain number of voxels wide by a certain number of voxels high by a certain number of voxels deep. Volume data set 302 is completely divided up into sub-volumes typical of sub-volume 304. Sub-volume 308 falls partially outside volume data set 302. In the preferred embodiment of the invention, tuple positions falling outside volume data set 302 are filled with zeros or some other non-important value.

Figure 4:
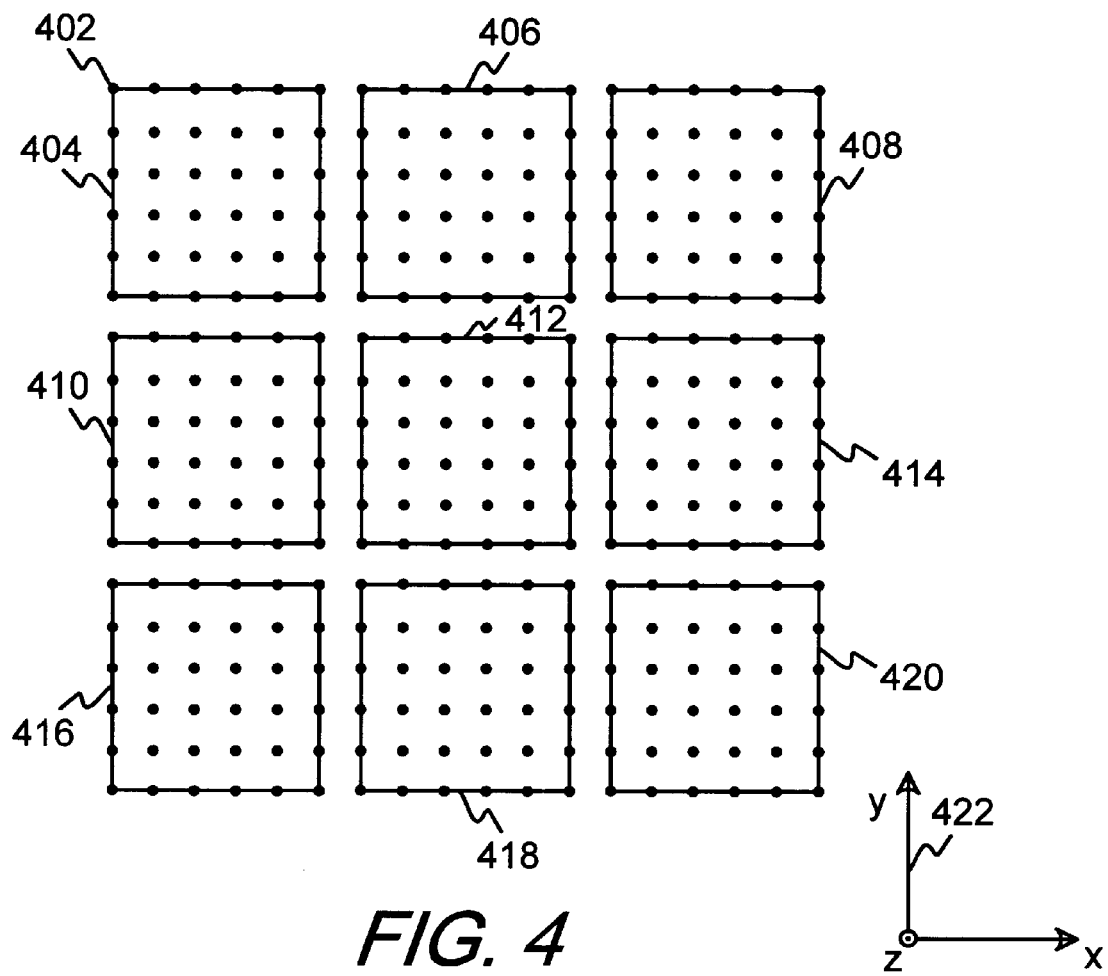
FIG. 4 illustrates graphically in two dimensions the non-overlapping blocking technique.

FIG. 4 illustrates graphically in two dimensions the non-overlapping blocking technique. Referring now to FIG. 4, voxel 402 is typical of all the voxels illustrated, which represents only a portion of all the voxels contained within a volume data set. Each voxel tuple has unique (x,y,z) coordinates. The depth in the z-direction extends perpendicularly from the plane of the paper as shown by key 422. Sub-volumes 404, 406, 408, 410, 412, 414, 416, 418, and 420 have outer boundaries which are illustrated as straight lines connecting the four bounding voxels visible in this two dimensional view. Each sub-volume 404 through 420 is six voxels wide by six voxels high by six voxels deep, and contains a unique set of voxels such that no sub-volume has any voxels in common with any other sub-volume.

Figure 5:
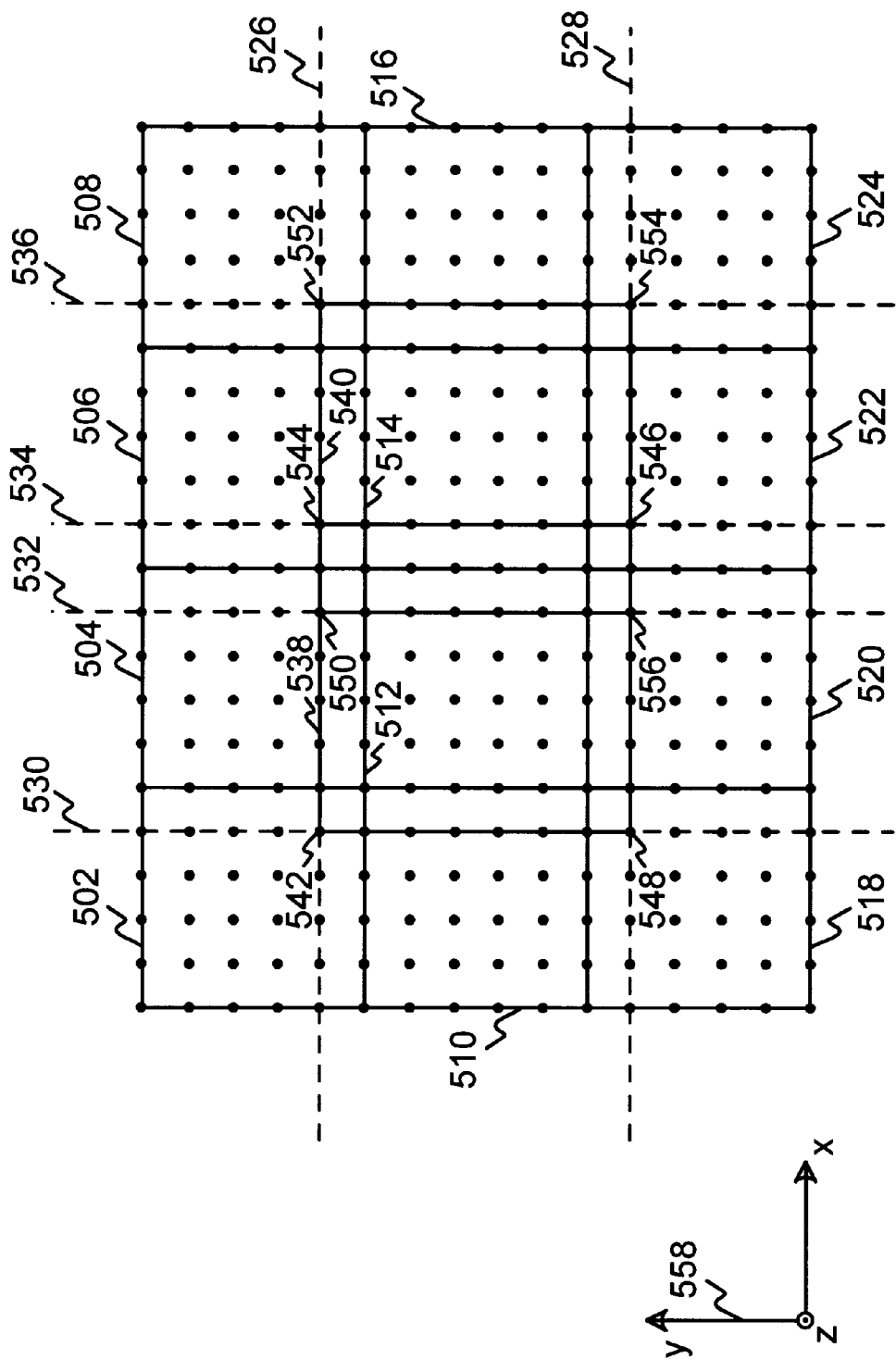
FIG. 5 illustrates graphically in two dimensions the overlapping blocking technique applied to FIG. 4.

FIG. 5 illustrates graphically in two dimensions the overlapping blocking technique. Referring now to FIG. 5, with the overlapping blocking technique sub-volumes are initially structured so that each sub-volume's bounding planes are shared with adjacent sub-volumes. Sub-volumes 502, 504, 506, 508, 510, 512, 514, 516, 518, 520, 522, and 524 are each six voxels wide by six voxels high by six voxels deep. The depth in the z-direction extends perpendicularly from the plane of the paper as shown by key 558. Each of these sub-volumes needs to be overlapped to become an expanded sub-volume. For example, sub-volumes 512 and 514 are overlapped by taking each of the six bounding planes that comprise sub-volumes 512 and 514 and expanding each plane one voxel out in a direction away from the center of each sub-volume, forming six new adjacent planes that contain additional voxels. All the voxels that lie in the six planes, including the voxels that lie along the twelve edges and eight corners formed by the intersection of the six new adjacent planes, are included in expanded sub-volumes 538 and 540.

Expanded sub-volume 538 is bounded by points 542, 544, 546, and 548 that represent lines in the z direction that appear as points in this 2D view. Planes 526 and 528 are adjacent planes in the x-direction. Planes 530, 532, 534, and 536 are adjacent planes in the y-direction. Planes 526, 528, 530, 532, 534, and 536 appear as edges in FIG. 5. Voxels from sub-volumes 502, 504, and 506 that lie on plane 526 and bounded by planes 530 and 534 are included in expanded sub-volume 538. Voxels from sub-volumes 506, 514, and 522 that lie on plane 534 and bounded by planes 526 and 528 are included in expanded sub-volume 538. Voxels from sub-volumes 518, 520, and 522 that lie on plane 528 and bounded by planes 530 and 534 are included in expanded sub-volume 538. Voxels from sub-volumes 502, 510, and 518 that lie on plane 530 and bounded by planes 526 and 528 are included in expanded sub-volume 538. One skilled in the art will recognize that for the two adjacent planes in the z-direction not shown in FIG. 5, the same inclusion of voxels occurs. In a similar fashion, expanded sub-volume 540 includes the voxels lying on planes 526, 528, 532, and 536 and bounded by points 550, 552, 554, and 556 that represent lines in the z direction that appear as points in this 2D view.

Figure 6:
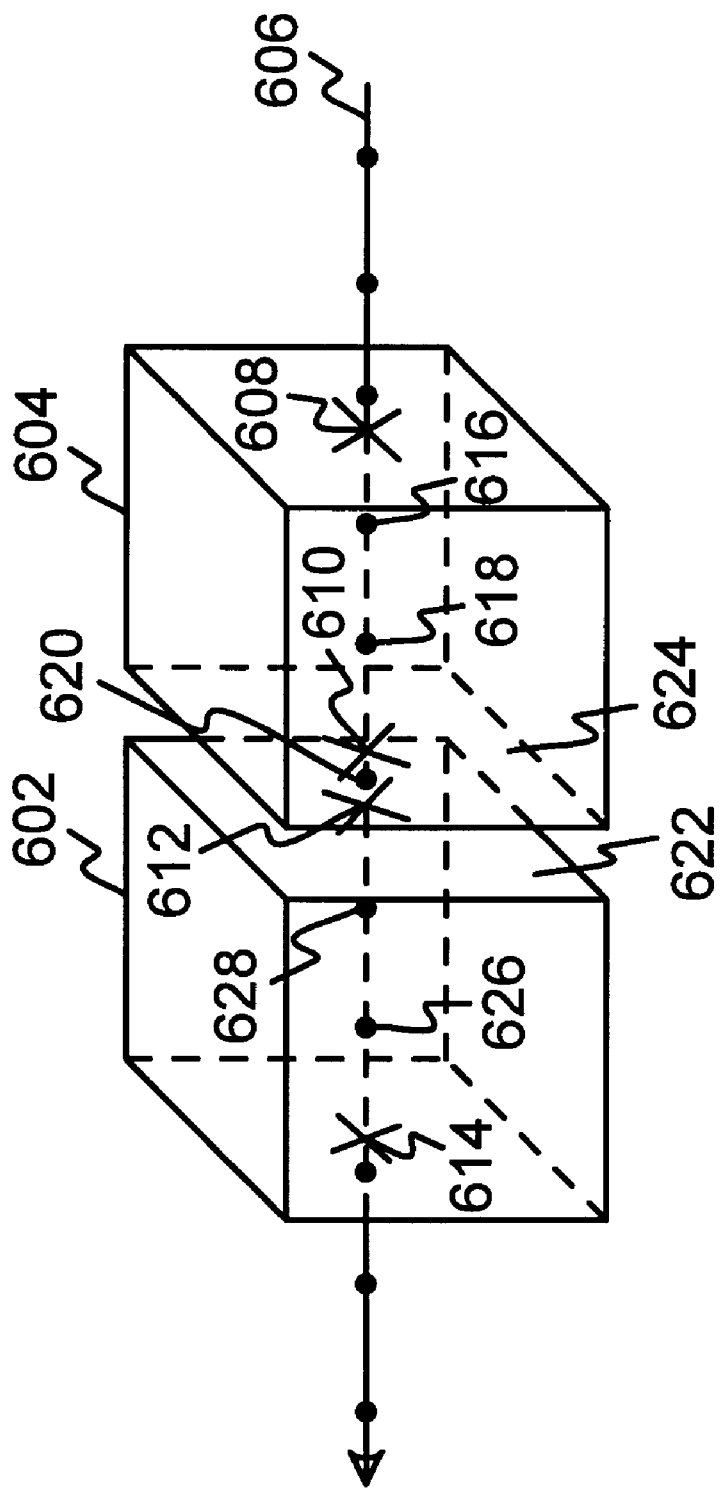
FIG. 6 illustrates graphically sample points along a ray that has been cast through a volume data set that passes through two non-overlapping sub-volumes.

FIG. 6 illustrates graphically sample points along a ray that has been cast through a volume data set that passes through two non-overlapping sub-volumes. Referring now to FIG. 6, sub-volumes 602 and 604 are adjacent to each other. Ray 606 has been cast from a pixel on an image plane through a volume data set and passes through sub-volumes 602 and 604. Ray 606 enters sub-volume 604 at enter point 608 and exits sub-volume 604 at exit point 610. Ray 606 enters sub-volume 602 at enter point 612 and exits sub-volume 602 at exit point 614. Sample points 616 and 618 on ray 606 fall within sub-volume 604. If sub-volume 604 has been selected as containing desired data, the volume rendering system will further process sample points 616 and 618 to help render the pixel that ray 606 emanates from. If sub-volume 604 has not been selected as containing desired data, then sub-volume 604 is ignored.

Sample points 626 and 628 on ray 606 fall within sub-volume 602. If sub-volume 602 has been selected as containing desired data, the volume rendering system will further process sample points 626 and 628 to help render the pixel that ray 606 emanates from. If sub-volume 602 has not been selected as containing desired data, then sub-volume 602 is ignored.

Sample point 620 on ray 606 does not lie within either sub-volume 602 or 604. If one or both of sub-volumes 602 or 604 have been selected as containing desired data, then both sub-volumes will need to be called up from memory and placed in cache in order for the volume rendering system to be able to process sample point 620 including calculating any gradients.

If sub-volumes 602 and 604 had been blocked by the overlapping blocking technique as shown and discussed in FIG. 5, and plane 624 was the common shared plane between sub-volumes 602 and 604, point 624 will fall within sub-volume 602. Sub-volume 602 would be able to process sample point 620 including calculating any gradients after being called up from memory and placed in cache. This is because sub-volume 602 in its expanded size includes the voxels contained in a parallel plane located one voxel over from plane 624 in a direction away from the center of sub-volume 602.

Having described a presently preferred embodiment of the present invention, it will be understood by those skilled in the art that many changes in construction and widely differing embodiments and applications of the invention will suggest themselves without departing from the scope of the present invention, as defined in the claims. The disclosures and the description herein are intended to be illustrative and are not in any sense limiting of the invention, defined in scope by the following claims.

What is claimed is:

1. A cache efficient volumetric data organization method for rendering a volume data set on a 2D graphics display of a computer system, said method comprising the steps of:
   (a) retrieving said volume data set from a storage medium;
   (b) selecting an entire sub-volume from said volume data set, wherein said selecting further comprises the steps of
      (b1) selecting said sub-volume of said volume data set wherein said sub-volume has six faces; and
      (b2) including within said sub-volume a group of additional voxels immediately surrounding said sub-volume to create an expanded sub-volume, said group of additional voxels being contained on a group of six planes, one of each of said group of six planes being parallel to a corresponding one of each of said six faces of said sub-volume, and further wherein one of each of said group of six planes is located adjacent to said corresponding one of each of said six faces of said sub-volume and in a direction away from a center of said sub-volume;
   (c) converting each address of a voxel tuple of said entire sub-volume to a linear address;
   (d) processing said entire sub-volume through a volume rendering system, and
   (e) repeating steps (b) through (d) for each sub-volume of said volume data set.

2. The method of claim 1 wherein said size of said sub-volume is smaller than a processor cache located on said computer system, and wherein said processor cache is smaller than a graphics controller cache located on said computer system.

3. The method of claim 1 wherein said size of said sub-volume is smaller than a graphics controller cache located on said computer system, and wherein said graphics controller cache is smaller than a processor cache located on said computer system.

4. The method of claim 1 wherein step (c) further comprises the following step (c1):
   (c1) storing data of each said voxel tuple of said sub-volume to a storage medium at said linear address.

5. The method of claim 1 wherein step (c) further comprises the following step (c1):
   (c1) storing parameters supplied by an application program, along with said data of each said voxel tuple of said sub-volume, wherein said application program utilizes said parameters to select said sub-volume for further processing by said volume rendering system.

6. The method of claim 6 wherein step (b2) further comprises the following step (b2a):
   (b2a) storing data of each said voxel tuple of said expanded sub-volume to a storage medium at said linear address.

7. A cache efficient volumetric data organization method for rendering a volume data set on a 2D graphics display of a computer system, said method comprising the steps of:
   (a) retrieving said volume data set from a storage medium;
   (b) dividing said volume data set into a plurality of sub-volumes wherein each of said plurality of sub-volumes contains a unique set of voxels, and wherein said dividing further comprises
      (b1) dividing said volume data set into said plurality of sub-volumes wherein each of said plurality of sub-volumes has six faces, and further wherein each of said plurality of sub-volumes that is adjacent to another of said plurality of sub-volumes share one of said six faces at each occurrence of adjacency, and
      (b2) including within each of said plurality of sub-volumes a group of additional voxels immediately surrounding each of said plurality of sub-volumes to create a plurality of expanded sub-volumes, each of said group of additional voxels for each of said plurality of sub-volumes being contained on a group of six planes, one plane of each of said group of six planes being parallel to one of each of said six faces of one of each of said plurality of sub-volumes, and further wherein one plane of each of said group of six planes is located adjacent to one of each of said six faces of each of said plurality of sub-volumes and in a direction away from a center of one of each of said plurality of sub-volumes;
   (c) converting each address of a voxel tuple of each of said plurality of sub-volumes to a linear address;
   (d) processing each of said sub-volumes through a volume rendering system, wherein each sub-volume is processed in its entirety before processing is started on a subsequent sub-volume.

8. The method of claim 7 wherein the size of each of said plurality of sub-volumes is smaller than a processor cache located on said computer system, and wherein said processor cache is smaller than a graphics controller cache located on said computer system.

9. The method of claim 7 wherein the size of each of said plurality of sub-volumes is smaller than a graphics controller cache located on said computer system, and wherein said graphics controller cache is smaller than a processor cache located on said computer system.

10. The method of claim 7 wherein step (c) further comprises the following step (c1):

(c1) storing data of each said voxel tuple of each of said plurality of sub-volumes to a storage medium at said linear address.

11. The method of claim 7 wherein step (c) further comprises the following step (c1):

(c1) storing parameters supplied by an application program, along with said data of each said voxel tuple of each of said plurality of sub-volumes, wherein said application program utilizes said parameters to select a certain number of said plurality of sub-volumes for further processing by said volume rendering system.

12. The method of claim 7 wherein step (b2) further comprises the following step (b2a):

(b2a) storing data of each said voxel tuple of each of said plurality of expanded sub-volumes to a storage medium at said linear address.

* * * * *